United States Patent [19]

Vargo

[11] Patent Number: 4,647,075

[45] Date of Patent: Mar. 3, 1987

[54] QUICK DISCONNECT COUPLING HAVING SPRING SAFETY INTERLOCK

[75] Inventor: Edward E. Vargo, Enid, Okla.

[73] Assignee: Central Machine and Tool Company, Enid, Okla.

[21] Appl. No.: 827,824

[22] Filed: Feb. 10, 1986

[51] Int. Cl.4 ............................................. F16L 35/00
[52] U.S. Cl. ...................................... 285/82; 285/312
[58] Field of Search .................... 285/81, 82, 312, 317, 285/5

[56] References Cited

U.S. PATENT DOCUMENTS

| | | |
|---|---|---|
| 3,124,374 | 3/1984 | Krapp . |
| 3,195,934 | 7/1965 | Parrish . |
| 3,314,698 | 4/1967 | Owens .................................. 285/312 |
| 3,439,942 | 4/1969 | Moore et al. ...................... 285/82 X |
| 3,976,313 | 8/1976 | Lauffenburger . |
| 4,295,670 | 8/1981 | Goodall et al. . |

Primary Examiner—Dave W. Arola
Attorney, Agent, or Firm—William R. Laney

[57] ABSTRACT

A quick disconnect coupling element which includes a laterally ported female socket body having a hose-receiving neck projecting therefrom. A pair of spaced lugs are disposed on opposite sides of each of a pair of latching handle ports opening into the female socket body, and each lug pair functions to pivotally support a latching handle having a camming surface located inside the female socket body. A wire safety spring element is mounted adjacent each latching handle and prevents the handle from prematurely unlatching a male coupling element from the female socket body as a result of vibratory forces.

7 Claims, 4 Drawing Figures

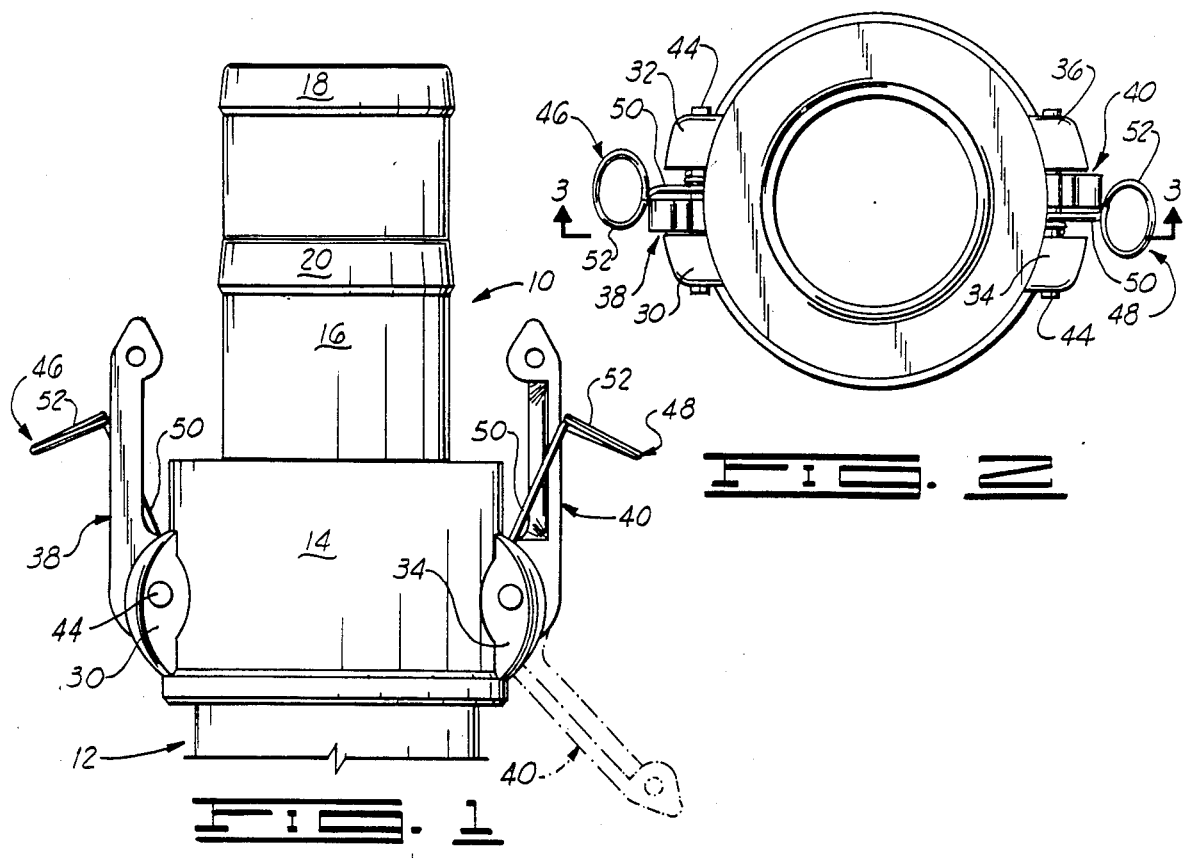
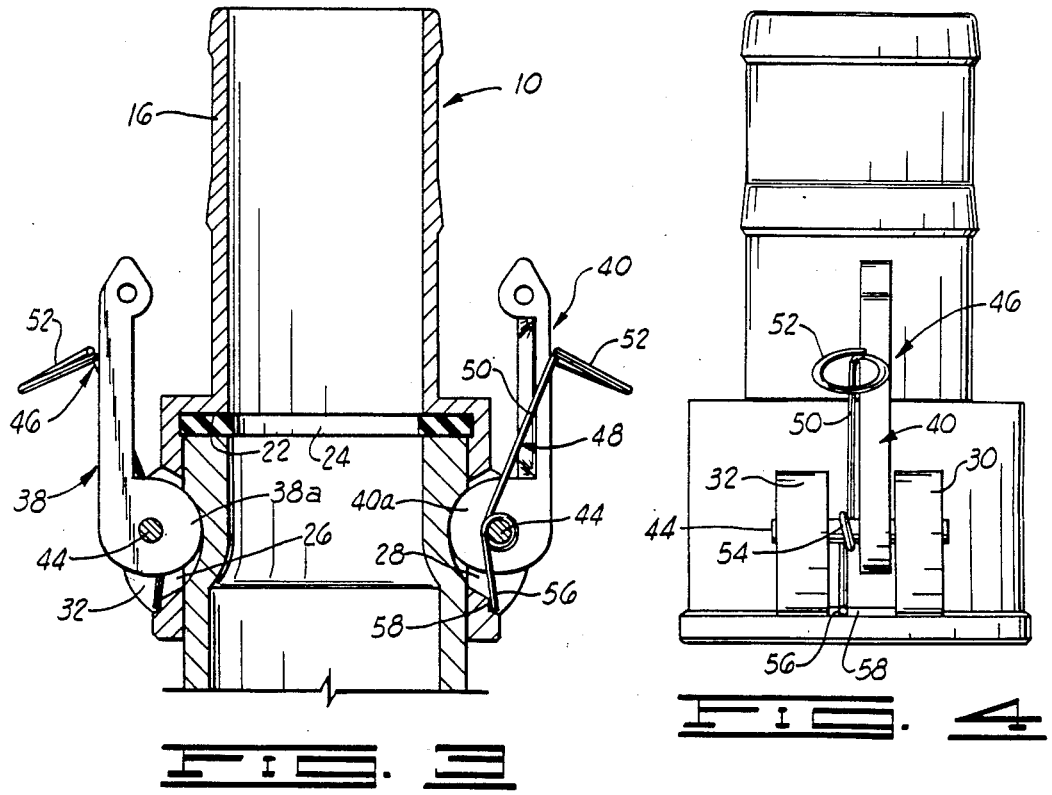

QUICK DISCONNECT COUPLING HAVING SPRING SAFETY INTERLOCK

FIELD OF THE INVENTION

This invention relates to quick disconnect couplings provided with structure to prevent inadvertent, untimely decoupling.

BACKGROUND OF THE INVENTION

BRIEF DESCRIPTION OF PRIOR ART

Quick disconnect separable coupling elements which utilize a female socket which receives a disconnectable male element are utilized in pressurized lines employed for delivering fuel and the like. In many of these devices, the female socket is provided with a pair of ports or openings through the wall thereof at opposite sides of the socket, and a pair of latching handles are pivotally mounted on the sides of the socket body. Each handle includes a cam portion which projects through the opening into the interior of the socket for the purpose of engaging cam surfaces carried on the outer side of the male element which is to be engaged with the female socket. When the handles are pivoted to their latching positions, the cam surfaces carried on the handles engage the cam surfaces on the male element to force it into tight sealing contact with a gasket or sealing ring provided on an internal shoulder within the female socket element.

Patents which have previously been issued on quick connect couplings of the type described include U.S. Pat. No. 3,124,374 to Krapp, U.S. Pat. No. 3,195,934 to Parrish, U.S. Pat. No. 3,314,698 to Owens, U.S. Pat. No. 3,976,313 to Lauffenburger et al, U.S. Pat. No. 4,295,670 to Goodall, U.S. Pat. No. 2,033,142 to Lewis, U.S. Pat. No. 2,478,586 to Krapp, U.S. Pat. No. 2,518,026 to Krapp, U.S. Pat. No. 2,770,256 to Krapp, U.S. Pat. No. 2,770,474 to Krapp, and U.S. Pat. No. 3,860,274 to Ledstrom.

It is a general practice in constructing quick release couplings of the type described to pivotally hinge the cam arms or latching handles by the use of a hinge pin inserted through projecting bosses or ears on the side of the female socket element.

It has previously been recognized that vibration, or, occasionally, excessive pressure in the line which contains the coupling, or inadvertently directed mechanical forces, can cause the coupling to become disengaged or disconnected at a time when it is carrying high pressure fluid, or at other undesirable times. For the purpose of preventing such inadvertent or unintended decoupling of the quick disconnect coupling, which action is generally accompanied by undesirable pivotation to the unlatching position of the latching handles or cam arms, various types of safety latches or elements have been proposed for use in conjunction with the cam arm or latching handles. Thus, in U.S. Pat. No. 3,976,313 to Lauffenburger et al, it is proposed to provide spring biased ball elements which are mounted in ears adjacent the path of movement of the cam arms. The balls project into this path of movement, and in order to be by-passed by the cam arms during the unlocking or disengaging motion thereof, the balls must be pressed into the ears against the action of the springs with which they are in contact. This requirement that the balls be displaced from their normal, spring biased position against the force exerted thereon by the springs assures that a positive and intentional force of substantial magnitude must be exerted upon the cam arms or latching handles in order to pivot them from the locking position, past the balls to the unlocking position.

Similar recognition of the problem of inadvertent, untimely decoupling of quick disconnect couplings of the type described is set forth in U.S. Pat. No. 4,295,670. This patent proposes to positively lock the latching handles in their latching positions by means of safety pins which are inserted through apertured lugs which are passed through openings in each handle intermediate its length. The pins thus occupy a blocking position preventing pivotation of the cam arms until the safety pins are pulled out of the retaining lugs. Of course, in one sense, an arrangement of this type where positioned pins provide a positive locking function which cannot be alleviated until the pins are pulled detracts or denigrates from the quick disconnecting criteria which is one of the features constituting a primary objective in the construction of such couplings.

In U.S. Pat. No. 3,314,698 to Owens, two methods are provided for retaining the cam arms carried on the coupling in a position which prevents their loosening due to vibration. In one of these, a simple ring is secured around each cam arm in a location where this ring is frictionally jammed into the slot into which the end portion of the respective cam arm pivots when the arm is moved to its locked position. This frictional jamming of the rings carried on the cam arms into such slots will then prevent the cam arms from falling free from their locking position under the influence of vibration.

In the second method proposed for preventing inadvertent loosening of the cam arms from their latching positions, a spring is provided on each of the cam arms. A medial part of the spring is coiled around the hinge pin which hingedly secures the cam arm to the female socket element. One end of this spring wire is then caused to bare against the outer side of the socket body, and the opposite end of the spring is secured to the free end of the cam arm so that pivotation of the cam arm from its latching to its unlatching position can be accomplished only by resiliently loading this spring in a compressed state in which its convolutions wrapped about the hinge pin are constricted. In other words, the wire spring is held under tension so that it constantly biases the cam arm toward the engaging or sealing position.

A problem posed by the wire spring safety element employed in the Owens patent is that the further the latching handle or cam arm is pivoted from its coupling toward its uncoupling position, the more highly loaded becomes the spring wire. The highest loading and most pronounced resilient deformation of this spring occurs at the time when the cam arm is pivoted to its fully open position. Thus, the spring exerts its highest return force on the arm in this position of the arm, and if the operator inadvertently releases the cam arm at this time, it will be rapidly and forceably returned to its locking position, thus posing some safety hazard to the operator.

BRIEF DESCRIPTION OF THE PRESENT INVENTION

The present invention provides a quick disconnect coupling having a spring safety interlock which functions to prevent vibrational loosening or decoupling of the coupling parts due to an untimely or unintended pivotation of the cam arms or latching handles employed in the coupling. Although, the spring safety interlock provided by the present invention effectively prevents decoupling of the quick disconnect coupling, it does not excessively resiliently load the latching handles or cam arms as they are pivoted to their decoupling position, thereby making them dynamic structures hazardous to the operator.

Broadly described, the quick disconnect coupling with spring safety interlock of the invention includes the usual female socket body or coupler which includes a hose receiving neck projecting coaxially from the socket body. The socket body is provided with a pair of opposed or lateral ports or openings through the wall thereof, and pairs of spaced lugs or ears are disposed on opposite sides of each of these ports or openings into the socket body. Each lug pair functions to pivotally support, in conventional fashion, a latching handle or cam arm. Each cam arm is provided with a camming surface located inside the female socket body. A wire safety spring loop is mounted adjacent each latching handle. These prevent the handles from prematurely unlatching a male coupling element or adapter which is locked to the female socket body, where such unlatching would otherwise result from the subjection of the coupling to vibrational or other inadvertently delivered forces.

Each safety spring loop includes, in a preferred embodiment of the invention, an elongated central or intermediate portion which carries a blocking loop at one end, and which extends into a pivot pin convolution at its other end. The pivot pin convolution is adapted to extend around the pivot pin by which the latching handle or cam arm is secured to the body of the female socket. A second end portion of each spring loop projects from the pivot pin to a location where it bares against a shoulder or abutment formed on the outer side of the female socket body.

When each safety spring loop element is mounted in the described position, it is susceptible to being resiliently urged in a direction which is radially outward with respect to the axis of flow through the coupling, and which is the direction of unlatching movement of the latching handles. It can also resiliently yield in a circumferential direction around the female socket body. These two directions of yielding movement will permit the respective latching arm which is associated with a respective one of the safety spring loops to be pivoted to an unlatching position by applying thereto a deliberate force of sufficient magnitude to pull the arm past the loop carried at one end of the safety spring loop assembly. Without the application of such deliberate force of adequate magnitude, however, each of the latching handles will be retained in its latching position against displacement by the normal vibratory forces which may act upon the respective handles, or by other inadvertent forces of relatively low magnitude.

Alternatively, the safety spring loop may be constructed so that it is relatively stiff and unyielding in a radial direction, but can be pushed laterally or in a direction which is normal to the plane in which the respective handle pivots. When using this embodiment, thumb pressure can be applied to push the blocking loop laterally out of the path of the latching handle as the latching handle is pivoted to the unlatching position.

An important object of the present invention is to provide a quick disconnect coupling having a safety spring interlock which, while preventing decoupling at inopportune or undesired times due to untimely or undesirable pivotation of the latching handles, does not constitute such an impediment to the pivotation of these handles or cam arms that they cannot be quickly and easily pulled to the unlatching position by the use of a deliberate force of sufficient magnitude which is properly directionally oriented.

A further object of the invention is to provide a quick disconnect coupling having a spring safety interlock provided as a part thereof, which interlock is relatively simple, and thus can be easily and economically constructed, yet which is highly reliable in achieving its intended function of preventing unsafe and unintended decoupling of a quick disconnect coupling without loss of the criteria, desirable in such couplings, of facilitating quick disconnection.

A further object of the invention is to provide a quick disconnect coupling having a safety spring interlock which is relatively more safe to utilize for the coupling together is lengths of high pressure service conduits and pipe in a high vibrational environment than other types of quick disconnect couplings which have been previously proposed or constructed.

Other objects and advantages of the invention, in addition to those which have been herein described, will become apparent to the reader as the following detailed description of a preferred embodiment of the invention is read in conjunction with the accompanying drawings which illustrate such preferred embodiment.

GENERAL DESCRIPTION OF THE DRAWINGS

FIG. 1 is a front elevation view of a quick disconnect coupling with spring safety interlock. Only a portion of the male adapter is illustrated, with the rest of this adapter being broken away. The unlatching position of one of the two latching arms which are provided is shown in dashed lines.

FIG. 2 is a plan view of the quick disconnect coupling.

FIG. 3 is a sectional view taken along line 3—3 of FIG. 2.

FIG. 4 is a side elevation view which illustrates the female adapter or socket as it appears when rotated through 90° from its position illustrated in FIG. 1.

DETAILED DESCRIPTION OF A PREFERRED EMBODIMENT OF THE INVENTION

A preferred embodiment of the invention is illustrated in the drawings. Such preferred embodiment of the quick disconnect coupling includes a coupler portion designated generally by reference numeral 10, and a male adapter portion, designated generally by reference numeral 12.

The coupler portion 10 includes a female socket body 14 which is of cylindrical configuration and which is connected at one of its ends to an elongated, general cylindrical hose-receiving neck 16. The neck 16 carries a pair of external annular ribs or protuberances 18 and 20 to frictionally retain the end of a flexible hose which is press fitted thereover. The socket body 14 defines an annular seat surface 22 upon which is seated an annular elastomeric seat ring 24.

A pair of openings or ports 26 and 28 are formed through the wall of the socket body 14 in opposite sides thereof as shown in FIG. 3. Each of the openings 26 and 28 is formed between a pair of protuberant ears or lugs. Thus, the opening 26 is formed between paired lugs 30 and 32, as best illustrated in FIGS. 3 and 4, and the opening 28 is formed between paired lugs 34 and 36. A pair of cam arms or latching handles 38 and 40 are secured on opposite sides of the female socket body 14 as illustrated in the drawings. Each of the latching handles 38 and 40 carries a cam lobe, designated 38a and 40a, respectively, at one end of the latching handle and each handle is pivotally mounted between the respective ear or lug pair 30, 32, or 34, 36 by means of a pivot pin 44 extended therethrough. The spacing between the respective lugs in each of the lug pairs 30, 32 or 34, 36 is such that a portion of each pivot pin 44 used to support the handles 38 and 40 remains exposed between the lug pairs as can be perceived best in FIGS. 2 and 4.

The cam lobe 38a or 40a at the end of each of the latching handles 38 and 40 is sized and configured so that the cam portion projects through a respective opening 26 or 28 into the interior of the socket body 14. In this position, the latching handles 38 and 40 can be pivoted to the latching positions illustrated in the drawings, in which positions these handles function to bias the male adapter portion 12 into sealing contact with the sealing gasket or ring 24 positioned on the seat 22 within the socket body 14. As will be understood by those skilled in the art, when the latching handles 38 and 40 are pivoted downwardly to a position such as that illustrated in dashed lines in FIG. 1, this releases or decouples the coupling so that the adapter portion 12 can be disengaged from the coupler portion 10.

In order to prevent random, inadvertent or accidental decoupling as a result of vibrational forces or misdirected blows which may strike the handles 38 and 40, a pair of wire safety spring elements 46 and 48 are provided, one in association with each of the latching handles 38 and 40. Each of the wire safety spring elements 46 and 48 includes an elongated central or intermediate portion 50 which carries a generally circular blocking loop 52 at an upper end thereof.

In referring to FIGS. 2 and 4 it will be perceived that the positioning of the safety spring elements 46 and 48 is such that the intermediate portions 50 of each safety spring element extends alongside a respective one of the latching handles 38 and 40, and lies in a plane which extends substantially parallel to the plane in which the respective latching handle pivots in moving from its coupling to its decoupling position. It will be further noted that the blocking loop 52 carried at the free upper end of the intermediate portion 50 of each of the safety spring elements 46 and 48 lies across, or projects into, the path of the respective latching handle 38 or 40 as the latching handle undergoes pivotation in moving from a latching position, as shown in FIG. 3, to the unlatching or decoupling position illustrated in dashed lines in FIG. 1.

At the opposite end of the intermediate portion 50 from the blocking loop 52, each of the safety spring elements 46 or 48 carries one or more convolutions or turns 54 which extend around and engage the exposed portion of one of the pivot pins 44, which exposed portion lies between the respective latching handle 38 or 40 and the adjacent lug 30, or 32, or 34 and or 36. The free end of the wire of which each safety spring element 46 or 48 is made contacts and bears against a shoulder or abutment 58 formed on the edge of the respective opening 26 or 28 through the wall of the socket body 14.

OPERATION

In the operation and utilization of the quick disconnect coupling with spring safety interlock, the adapter 12, connected at one end of a flexible hose, pipe or the like, is inserted into the socket body 14 of the coupler portion 10. The latching handles 38 and 40 are then pivoted from their open position, as shown in dashed lines in FIG. 1, to their latching positions in which they extend parallel to the axis of the coupling. The adapter is thereby biased into sealing contact with the elastomeric sealing ring 24. With the coupling thus engaged, high pressure service can be carried on through the flexible lines or conduits connected to the coupler portion 10 and to the adapter portion 12, respectively.

If, during the use of the system, vibrational forces tend to jar or shake the latching handles 38 and 40 from the illustrated locking positions, and to cause them to undergo outward pivotation in a direction such that the coupling may be decoupled or released, the movement of the latching handles is arrested by contact with the wire safety spring elements 46 and 48, and more specifically, with the generally circular locking loops 52 forming a part of these spring elements. The blocking loops prevent any further radially outward pivotal movement of the latching arms, and thus prevent the coupling from becoming released.

At the time when it is desired to release the coupling, a deliberate force of substantial magnitude is used to pull each of the latching arms 38 and 40 past the blocking loops 52 forming parts of the wire safety spring elements 46 and 48. This can be achieved because the blocking loops 52 can yield in both a radial direction, and a lateral or circumferential direction, to permit the latching handles to pass. Moreover, the geometric configuration of the blocking loops 52 is such that as the handle bears against the curved portion of the wire of which the loops are formed, the loops are wedged outwardly without any propensity to hang or to be bent by the force supplied through the latching handles.

When it is desired to recouple the coupling and restore it to service, the reverse action is carried out, and the blocking loops 52 again will yield to the pivoting movement of the latching handles to permit them to pass. Again, the circular configuration of the wire in the blocking loops prevents any hanging or damaging engagement between the latching handles and any part of the wire safety spring elements 46 and 48.

In an alternate embodiment of the invention, the wire of which each safety spring element 46 and 48 is constructed is made stiffer, and the geometry of the blocking loop is altered slightly, so that simply pulling the handle toward an unlatching position will not allow it to move past the respective safety spring element. Rather, to unlatch or decouple the coupling, it is necessary to first force the blocking loops in a lateral direction, or, stated differently, normal to the planes in which the handles pivot, in order to allow the handles to move to the unlatching position. This can be accomplished by thumb pressure.

From the foregoing description of the invention, it can be perceived that the invention provides a simply constructed, yet effective means for preventing the unintended and untimely decoupling or disengagement of the parts of a quick disconnect coupling of the type similar to many which have been heretofor utilized. The structure which is employed to prevent such dangerous decoupling is very safe in use, and because of its particular construction and geometry, it is characterized in having a long and trouble-free operating life in which it does not fail, but continues to operate effectively.

Although preferred embodiments of the invention have been herein described in order to illustrate the general principles upon which the invention is based, it will be understood that various changes and innovations can be made in the illustrated and described structure without departure from the basic principles upon which the invention depends. Changes and innovations of this type are therefor deemed to be circumscribed by the spirit and scope of the invention, except as such scope may be necessarily limited within a reasonably broad construction of the appended claims.

What is claimed is:

1. A quick disconnect coupling with spring safety interlock comprising:
   a coupler which includes a hollow female socket body having a pair of openings in opposite sides thereof;
   a tubular hose-receiving neck projecting axially from the socket body;
   a male adapter having a portion projecting into said socket body;
   a pair of latching handles pivotally connected to the socket body adjacent said openings and each including a cam lobe projecting through one of said openings into the interior of the socket body;
   pivot pins pivotally holding the latching handles to the socket body; and
   a safety spring element mounted on said socket body by attachment to one of said pivot pins at a location adjacent each of said latching handles, each of said safety spring elements including:
   a blocking loop resiliently positioned in the path of movement of the nearest latching handle as the nearest latching handle pivots from a latching position in which the male adapter is coupled to the female coupler, to a decoupling position in which the respective latching handle projects outwardly from the socket body;
   an end portion attached to one of said pivot pins; and
   an intermediate portion extending between said blocking loop and said end portion and means limiting rotation of said end portion relative to said female socket body during decoupling movement of said latching handles.

2. A quick disconnect coupling as defined in claim 1 and further characterized as including:
   pairs of lugs secured to said socket body on opposite sides thereof, the two lugs in each lug pair being disposed on opposite sides of one of said openings; and
   said pivot pins each pivotally supporting one of said latching handles between the lugs in one of said pairs; and
   wherein a convolution adjacent said end portion of each of said safety spring elements encircles one of said pivot pins and thereby retains the respective spring element on said socket body, and said blocking loop thereof in the path of movement of the nearest latching handle.

3. A quick disconnect coupling as defined in claim 1 wherein each of said safety spring elements is configured and mounted so that its respective blocking loop is resiliently yieldable in a radial direction, and in a direction circumferentially around said socket body whereby, by resiliently yielding, said blocking loops allow said handles to pass by said handles forcing said blocking loops out of said paths of movement.

4. A quick disconnect coupling as defined in claim 3 wherein said socket body defines a shoulder adjacent each of said openings, and wherein each of said safety spring elements includes:
   an intermediate portion having said blocking loop on one end thereof, said blocking loop having a circular configuration;
   a convolution on the other end of said intermediate portion from said blocking loop and extending around one of said pivot pins; and said means includes said shoulders and
   a free end projecting from said convolution and bearing against one of said shoulders.

5. A quick disconnect coupling with spring safety interlock comprising:
   a coupler which includes a hollow female socket body having a pair of openings in opposite sides thereof and defining a shoulder adjacent each of said openings;
   a tubular hose-receiving neck projecting axially from the socket body;
   a male adapter having a portion projecting into said socket body;
   a pair of latching handles pivotally connected to the socket body adjacent said openings and each including a cam lobe projecting through one of said openings into the interior of the socket body;
   pivot pins pivotally supporting said handles on said body; and
   a safety spring element mounted on said socket body adjacent each of said latching handles, each of said safety spring elements including:
   a blocking loop resiliently positioned in the path of movement of the nearest latching handle as the nearest latching handle pivots from a latching position, in which the male adapter is coupled to the female coupler, to a decoupling position in which the respective latching handle projects outwardly from the socket body;
   an intermediate portion having said blocking loop on one end thereof, said blocking loop having a circular configuration;
   a convolution on the other end of said intermediate portion from said blocking loop and extending around one of said pivot pins; and
   a free end projecting from said convolution and bearing against one of said shoulders.

6. A quick disconnect coupling as defined in claim 5 wherein each of said safety spring elements is configured and mounted so that its respective blocking loop is resiliently yieldable in a radial direction, and in a direction circumferentially around said socket body, whereby, by resiliently yielding, said blocking loops allow said handles to pass by the blocking loops as said handles force said blocking loops out of the paths of movement.

7. A quick disconnect coupling as defined in claim 6 and further characterized as including pairs of lugs secured to said socket body on opposite sides thereof, the two lugs in each lug pair supporting therebetween one of said pivot pins and, being disposed on opposite sides of one of said openings.

* * * * *